US008700914B2

(12) United States Patent
Kock et al.

(10) Patent No.: US 8,700,914 B2
(45) Date of Patent: Apr. 15, 2014

(54) METHOD AND SYSTEM FOR CHANGING SAFETY-RELEVANT DATA FOR A CONTROL DEVICE

(75) Inventors: Soenke Kock, Vaesteras (SE); Peter Eriksson, Vaesteras (SE); Jan Bredahl, Vaesteras (SE); Michael Niehaus, Florstadt (DE)

(73) Assignee: ABB AG, Mannheim (DE)

( * ) Notice: Subject to any disclaimer, the term of this patent is extended or adjusted under 35 U.S.C. 154(b) by 1549 days.

(21) Appl. No.: 12/301,197

(22) PCT Filed: Apr. 26, 2007

(86) PCT No.: PCT/EP2007/003664
§ 371 (c)(1),
(2), (4) Date: Nov. 17, 2008

(87) PCT Pub. No.: WO2007/131603
PCT Pub. Date: Nov. 22, 2007

(65) Prior Publication Data
US 2009/0313481 A1    Dec. 17, 2009

(30) Foreign Application Priority Data
May 15, 2006   (EP) .................... 06009937

(51) Int. Cl.
*G06F 11/30* (2006.01)
*G05B 19/04* (2006.01)
*G06F 21/57* (2013.01)

(52) U.S. Cl.
CPC ...... *G05B 19/04* (2013.01); *G05B 2219/25068* (2013.01); *G05B 2219/24159* (2013.01); *G05B 2219/23214* (2013.01); *G05B 2219/24155* (2013.01); *G05B 2219/24163* (2013.01); *G06F 21/572* (2013.01)

USPC ........... 713/189; 713/100; 713/181; 713/182; 713/184; 713/193; 713/176; 726/1; 726/2; 726/4; 726/5; 726/7; 726/16; 726/27; 726/28; 455/420; 714/37

(58) Field of Classification Search
CPC ..................... G05B 19/04; G05B 2219/25068; G05B 2219/23214; G05B 2219/24155; G05B 2219/24159; G05B 2219/24163; G06F 21/572
USPC ............ 726/1, 2, 4, 5, 16, 27, 28, 7; 713/100, 713/182, 184, 1, 181, 189, 193; 455/420; 714/37

See application file for complete search history.

(56) References Cited

U.S. PATENT DOCUMENTS

| | | |
|---|---|---|
| 5,648,898 A | 7/1997 | Moore-McKee et al. |
| 6,081,755 A | 6/2000 | Fujimoto et al. |
| 6,785,816 B1 | 8/2004 | Kivimaki et al. |
| 7,716,491 B2 * | 5/2010 | Brookner et al. ............. 713/184 |
| 7,735,132 B2 * | 6/2010 | Brown et al. .................... 726/20 |
| 2002/0120856 A1 * | 8/2002 | Schmidt et al. ............... 713/193 |
| 2003/0140221 A1 * | 7/2003 | Garnett ............................ 713/1 |
| 2003/0159045 A1 * | 8/2003 | Nishimoto et al. ........... 713/176 |
| 2003/0223584 A1 * | 12/2003 | Bradley et al. ................ 380/229 |
| 2004/0025086 A1 * | 2/2004 | Gorday et al. .................. 714/37 |
| 2004/0250070 A1 * | 12/2004 | Wong ............................ 713/170 |
| 2005/0010786 A1 * | 1/2005 | Michener et al. ............. 713/185 |
| 2005/0138382 A1 * | 6/2005 | Hougaard et al. ............ 713/176 |
| 2005/0221811 A1 * | 10/2005 | Straub et al. .................. 455/420 |
| 2007/0005992 A1 * | 1/2007 | Schluessler et al. .......... 713/193 |

FOREIGN PATENT DOCUMENTS

| | | |
|---|---|---|
| EP | 1150190 | 10/2001 |
| EP | 1351480 A1 * | 10/2003 |

* cited by examiner

*Primary Examiner* — Brian Shaw
(74) *Attorney, Agent, or Firm* — Leydig, Voit & Mayer, Ltd.

(57) ABSTRACT

A system and method for changing safety-relevant data for a control device is provided wherein an authorized user inputs new or altered safety-relevant data, which is received on a data processing installation. A first checksum for the safety-relevant data is established and stored along with the safety-relevant data in at least one data record on the data processing installation. An enable code may also be stored in the at least one data record. This enable code may be produced by a code generator and encrypted by a key module. The data processing installation then reads back the safety-relevant data from a memory in the data processing installation, thereby allowing a comparison of the received safety-relevant data and the read back safety-relevant data. A second checksum is generated in a case where the comparison resulted in no differences. The second checksum may also be stored in the at least one data record. At least one new data record containing the safety-relevant data, the encrypted enable code and the first and second checksums is created and transmitted to the control device. The new data record is checked against prior data records and prior checksums stored on a storage medium to determine that the at least one new data record is known to the control device.

11 Claims, 3 Drawing Sheets

METHOD AND SYSTEM FOR CHANGING SAFETY-RELEVANT DATA FOR A CONTROL DEVICE

This is a U.S. National Phase application under 35 U.S.C. §371 of International Application No. PCT/EP2007/003664, filed Apr. 26, 2007 and claims the benefit of European Patent Application No. EP 06009937.1, filed on May 15, 2006. The International Application was published in German on Nov. 22, 2007 as WO 2007/131603 A1 under PCT Article 21 (2).

FIELD OF THE INVENTION

The invention relates to a method and a system for creating or changing safety-relevant data for a control apparatus and activation thereof.

BACKGROUND

It is generally known that control devices working with safety-relevant data have particular control and checking steps provided for changing such data. In this case, safety means industrial safety or personal safety. A control device of this kind may be the control apparatus for monitoring a robot or a device for controlling and monitoring the sequences in a production cell, for example. During the execution of robot movements, the people in its operating area may quite generally be at risk, for example. This needs to be avoided, however. By way of example, safety-relevant data for such a robot are, by way of example, data which monitor or restrict the robot's sequence of movement using a control device or directly in the robot control and hence accordingly protect the area potentially at risk as a result of the robot movement. However, safety-relevant data are also programs and data which are processed in a control device, for example, in order to prevent the risk to a machine operator by producing signals for actuating protection devices. These signals are produced on the basis of further signals which are emitted by at least one safety-oriented device, for example by a door switch or a laser scanner, and on the basis of the safety-relevant data which are processed in the control device (principle of programmable logic controllers).

It is known from safety engineering that most accidents are caused not by failure of the safety devices but rather by conscious manipulation thereof by operating or maintenance personnel. For this reason, it should always be ensured that the manipulation of safety-oriented control data is prevented as far as possible or that the complexity of manipulation thereof is made as high as possible by suitable methods (which corresponds to the term "security").

The appearance of configurable and programmable control devices presents the additional risk of the start-up engineer activating incorrect programs and data, so that additional protection would be desirable which prevents programs and configuration data from being transposed and erroneously activated.

To create or change safety-relevant data for such control devices, it is generally known practice for a special user program initially to be started on a configuration computer. This program is then used to make inputs or changes which are downloaded to the control device. Next, the data are loaded back onto the configuration computer by the control device, and when the safety-relevant data are loaded back the configuration computer uses the configuration program to compare whether the program loaded back corresponds to the original program, for safety reasons. In this way, it is established whether errors have occurred during the transmission of the program or whether the changes can be accepted. In a final step, the user gives the control device the instruction to accept and execute the new data.

SUMMARY OF THE INVENTION

It is an aspect of the invention to provide a method and a system for creating and/or changing safety-relevant data for a control device which can be used flexibly, safely and easily.

In an embodiment, the present invention provides a method for changing said safety-relevant data for a control device that includes the following steps: receiving the safety-relevant data on a data processing installation; establishing a first checksum for the safety-relevant data; storing the safety-relevant data and the first checksum in at least one data record on the data processing installation; storing an enable code in the at least one data record produced by a code generator, the enable code being encrypted by a key module; reading back the safety-relevant data from a memory in the data processing installation; comparing the received safety-relevant data and the read back safety-relevant data; establishing a second checksum in a case where the comparing step resulted in no differences, the second checksum being stored in the at least one data record; transmitting the at least one data record to the control device with the safety-relevant data, the encrypted enable code and the first and second checksums as at least one new data record; and checking the at least one new data record against prior data records and prior checksums stored on a storage medium to determine that the at least one new data record is known to the control device.

BRIEF DESCRIPTION OF THE DRAWINGS

The invention, advantageous refinements and improvements of the invention, and particular advantages of the invention will be explained and described in more detail with reference to the exemplary embodiments shown in the drawings, in which.

DETAILED DESCRIPTION OF THE PREFERRED EMBODIMENTS

Figure 1:
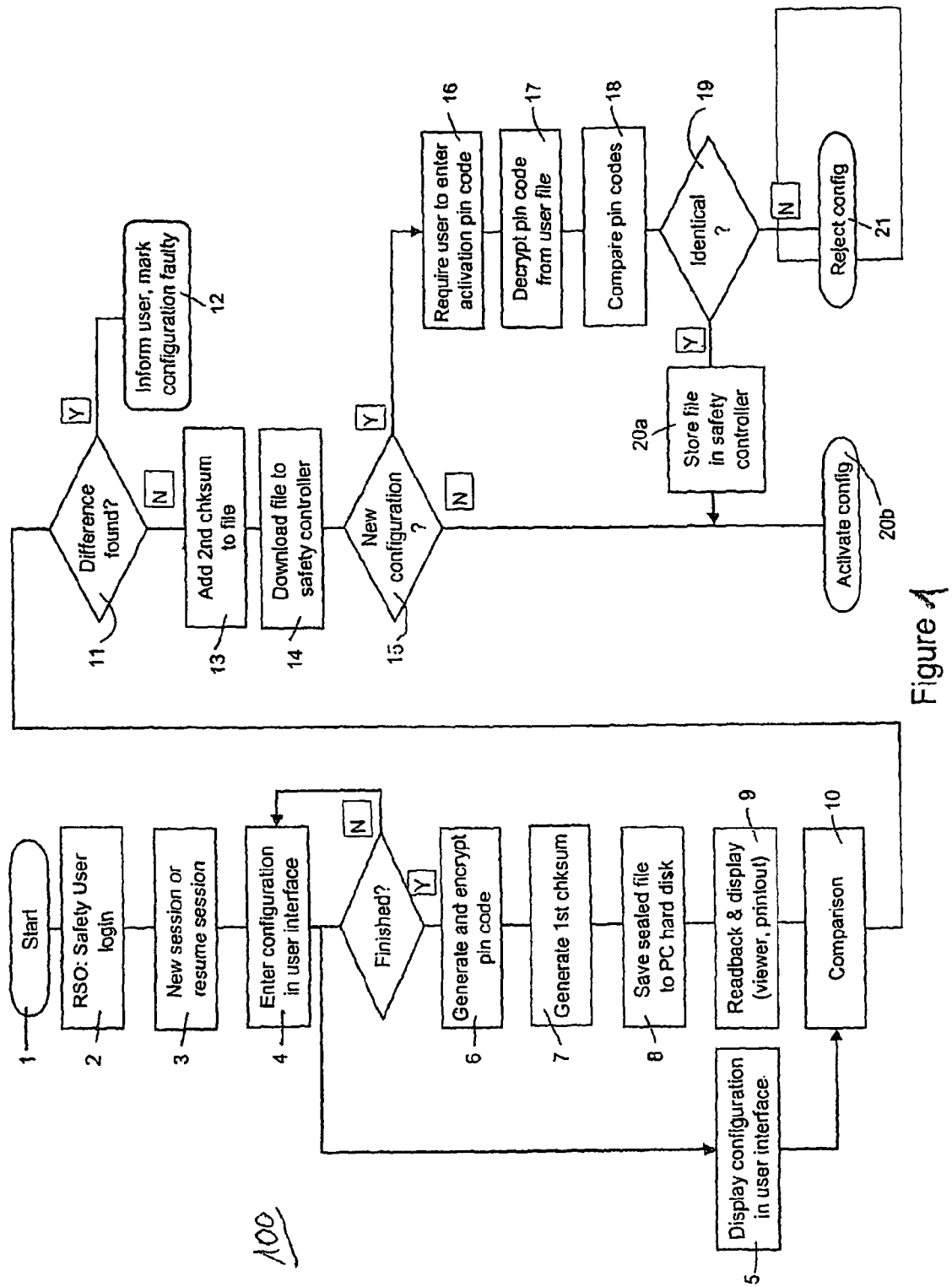
FIG. 1 shows a method flow for a method for creating or changing safety-relevant data.

The method according to the invention demonstrates a way of capturing or changing the safety-oriented data and, by forming checksums, of checking both the individual method steps and the cheek to determine whether the changed data actually represent the desired change, including under the demanded safety requirements. The practice described above also ensures that the data can be created or changed without a direct connection ("offline") to the relevant control device, advantageously even using a general-purpose or standard computer and later without loading a fresh check onto a control unit. A control device or control unit is also to be understood to mean a monitoring device. It is even possible for the created data record to be used with new or changed data for a plurality of control devices. By way of example, this could be advantageous if a plurality of identical production installations are being used for which particularly rapid start-up of the respective control devices is desired.

The method according to the invention also allows the relevant or desired creations or changes to be made without the interchange of safety programs between the data processing installation and the control device. This also involves a flexibilization step for the methods disclosed to date.

The method according to the invention also allows there to be no direct connection between the configuration PC and the control device but rather, instead, the data transmission to be effected using portable data storage media (e.g. memory card, USB stick, floppy disk), or a further data processing installation or control unit to act as a buffer store and to forward the relevant data to the actual control device upon request via a direct connection.

In an embodiment, the present invention provides a method for creating and changing safety-relevant data in a control device wherein at least one data record that is transmitted to the control device with the sealed data and with the first and second checksums as at least one new data record and wherein the at least one new data record is checked by the control device before it is activated in the control device.

This allows the at least one new data record to be transmitted particularly easily to the control device which uses the safety-relevant data. In this way, the data transmission of safety-relevant data to the control device is implemented in particularly simple fashion.

In one expedient refinement of the method according to the invention, before activation of the at least one new data record an enabling method is performed, enabling preferably being effected using an enable code from an authorized user.

Performing the enabling method allows additional safety as a result of an additional check on the at least one new data record before the activation in the control device. In this case, the enabling method can be performed automatically by means of comparison with other data records, but also preferably by means of a check by an authorized user, for example an operator or startup engineer. In this case, it is particularly advantageous if such a user performing the enabling is identified by a PIN code (Personal Identification Number code) or a password and hence also documents who provided the enabling, and then inputs an enable code which has been produced before creation of the first checksum by the creation program and which identifies the data record to be enabled as explicitly as possible. To allow this, the enable code should have been created by a random number generator and should contain at least three, advantageously four, decimal numbers, letters or other readable characters. Erroneous enabling of an incorrect data record as a result of transposition is prevented by virtue of the enable code being valid only for a respective single data record and the startup engineer needing to try to get the correct enable code beforehand. Global enabling, for example using a standard password for safety devices, is therefore no longer possible, which means that erroneous activation is more or less impossible.

The invention achieves a further safety enhancement for the editing of the safety-relevant data by virtue of the authorization data which are interchanged between the control device and an input device, for example, being in encrypted form in the enabling method.

The invention achieves a further safety enhancement for the editing and activation of the safety-relevant data by virtue of the actual data being unencrypted and in a form which can be read by human beings using simple means in a file (for example in XML format), so that the startup engineer can make sure of the content of the data again at any time, but without being able to change or manipulate the sealed data after the production of the second checksum, and without reading the activation code without authorization.

One system according to the invention for carrying out a method according to the invention for changing safety-relevant data for a control device has a data processing installation which has a first input apparatus for creating new or changed data and a first encryption module. In addition, the data processing installation is at least intermittently connected to the control installation, wherein the data processing installation has a second encryption module and wherein the encryption methods of the first and second encryption modules are known to the respective other encryption module.

In this case, data integrity may be assured by the inventive arrangement of the encryption modules in the control device and the data processing installation. In this way, the data processing installation can be readily operated and the data can therefore be created and changed thereon. It may be connected to the control device intermittently, namely particularly at the time at which the data or the at least one new data record is/are transmitted. A system in this form can therefore be used with particular flexibility. The aforementioned alternative methods can be used to transmit the data easily even without a direct connection.

To make the system according to the invention even more flexible, provision is made for the control device to have a second input apparatus or to have access to such an apparatus.

In this way, additional safety checks or confirmations can be made using a second input apparatus on the control device independently of the first input apparatus on the data processing installation.

FIG. 1 shows a method flow 100 for a method according to the invention for creating or changing safety-relevant data in a control device which, in the example chosen, is built into a robot controller. In the example, the method according to the invention is also equipped as a program product which is executed on a general-purpose data processing installation, the method steps being explained in more detail below.

In a first step 1, the method is started, for example by starting an appropriate configuration program on a standard computer, such as a general-purpose PC (personal computer). For access control for the method, in the example chosen the access authorization to use the method is first of all requested by a second step 2. In a third step 3, the user is then given the choice of creating a new configuration for data or of continuing to work using an already existing configuration. Depending on the form of the method according to the invention, in a fourth step 4 the user is assisted with the aid of supplementary functions, such as interactive help, graphical assistance, table overviews, flowcharts or other information, relating to robot control setting, relating to previous workflows or the like.

It has also been found to be beneficial that in a fifth step 5 the respectively current configuration data which are being employed are possibly also displayed in comparison with the original configuration data. In this way, it is a particularly simple matter to identify any change and there is also an indication of which data have already been input or altered. The method then remains in the fourth step 4 and the fifth step 5 until data input is complete. As soon as this is the case, for example as a result of appropriate confirmation of a request to determine whether the data have been input completely, a random number generator is used in a sixth step 6 to produce a random enable code, and the latter is encrypted using a suitable method and hence rendered unreadable for human beings. Such encryption operations and options are known generally, as is working with these PIN (Personal Identification Number) codes. Encryption methods which may be mentioned here merely by way of example are symmetrical encryption or asymmetrical encryption. In this case, the encryption described for the safety-relevant data too is just one option. It is entirely sufficient to encrypt just the checksum or the checksums.

In this case, there is the assurance that the encryption method is known both by the general-purpose computer and by the control device so that the latter can decrypt the enable code again but that an unauthorized party cannot read the enable code from the data record. The configuration data are then stored as a data record in the main memory of the standard computer. In a seventh step 7, a first checksum for the data record is then formed and likewise stored in the data record. The exact method for forming the first checksum is preferably known only on the standard PC and the control device. This method step also enhances safety against possible incorrect transmission of configuration data, for example as a result of incorrect transmission, as a result of incorrect storage or similar errors which may arise in data processing installations, or else enhances safety against manual manipulation of the data by unauthorized persons. In an eighth step 8, the complete configuration file, that is to say the configuration data, the enable code and the first checksum, is stored as a file on the hard disk or another permanent memory in the standard PC.

This data record now essentially provides all the information which is required by the control device. To enhance safety further, however, in a ninth step 9 the user who prompted the changes to the safety-relevant data is asked to check the stored data, specifically by reading the data record stored on the hard disk or the like and displaying them on a display apparatus, for example using an appropriate piece of display software, on a screen or the like. In addition or as an alternative to display, the data may also be printed on an appropriate printing apparatus. He now has the task of comparing the data with the data displayed in step 5, the form of the presentation differing in step 5 and step 9. This comparison is made in step 10 by said user, who now checks, for all data stored in the data record, whether all changes correspond to what is desired. If the user finds errors, an eleventh step 11 is taken as a basis for putting the method back to an earlier method step which allows the error found to be corrected, new or changed safety-relevant data to be input and encrypted in line with the previously performed steps, and the method to be executed such that finally the eleventh step 11 is reached again. The user is informed about this in a twelfth step 12. In particular, the user is informed about the difference which has arisen in the safety-relevant data, about the fact that the configuration data are marked as incorrect and about the fact that these configuration data cannot be used for the control device but rather can only be handled further by means of appropriate further method steps, as described above.

Only if no difference is found, that is to say no incorrect configuration data have arisen, is a second checksum formed in a thirteenth step 13 and this checksum likewise stored in the data record, so that it is recognizable in the data record itself that the data have been checked by the user.

The method steps from the first step 1 to the thirteenth step 13 essentially allow "offline" editing of safety-relevant data, that is to say creation of a changed data record for safety-relevant data, without the standard PC used for this needing to be connected to the control device. This provides a fundamental advantage of the method according to the invention, namely that data records can be changed both independently of location and independently of time. Nonetheless, the safety and protection of the changed data record from inadvertent damage, unintentional mis-input or else deliberate manipulation to invalidate or change safety monitoring measures are sufficiently safeguarded by a plurality of control and access protection mechanisms. The data file created in this manner can easily be transmitted to one or else more control devices which will recognize said data file as checked and safe data.

The specific way in which the safety-relevant data of the data record now reach the robot controller and the way in which they are checked will be explained in more detail below.

In a fourteenth step 14, the data record is then transmitted from the PC to the robot controller. In this case, it does not matter whether the data are transmitted to the control device directly from the hard disk or an appropriate medium or, by way of example, via a network connection which connects the standard PC to the control device or via a portable data storage medium or via another control computer which acts as an interposed data broker. In a fifteenth step 15, the control device will first of all establish whether the configuration data obtained are new, that is to say are a change from the previously known data, or whether the data obtained have already been used in the controller before. This check can also be performed in various, generally known ways. However, when using checksums, it is appropriate to use precisely these to check the configuration data obtained. To this end, the checksums obtained in the configuration file are compared with the known checksums held in a permanent memory (memory card, hard disk, floppy disk or the like). Instead of checksums, it is also possible to use what are known as hash codes, which are generally known per se, or it is also possible to perform a full comparison of the data.

If new configuration data are detected, in a sixteenth step 16 the user is asked by means of an appropriate "interface", for example a display apparatus on the handheld control unit or on the user terminal, whether the new configuration data obtained need to be activated in the robot controller. For such confirmation, it makes particular sense to request an activation code, and in particular this can be done using that encrypted activation code which has been created in the sixth step 6. It is also conceivable to additionally use another individualizing code which identifies the user making the input as the authorized user. The activation code which is input is then transmitted to the control device. In a seventeenth step 17, the relevant code from the configuration file is decrypted by the control device. Finally, in an eighteenth step 18, the code input by the user from the sixteenth step 16 and the code from the configuration file are compared or checked by the control device, and identity or appropriate other authorization checks establish(es) whether or not there is authorization to activate the file (which is done in a nineteenth step 19). If it is established in a nineteenth step 19 that the comparison of the codes results in no authorization, the method according to the invention establishes in a twenty-first step 21 that the configuration file is not activated and is accordingly rejected.

In an alternative method, it is possible to dispense with the decryption of the code by the control device and instead for the code input by the user to be encrypted using an identical method, so that the check for identity is performed using the encrypted codes. This allows the use of encryption methods which work only in one direction.

In the other case, namely that in the nineteenth step 19 it is established that there is authorization to activate the configuration file, the new configuration is stored in the permanent memory of the control device in an enabling step 20a and the new configuration is activated in the control device in an activation step 20b, so that the control device can operate on the basis of the new configuration data.

It will also be noted that if it is established in the fifteenth step 15 that the transferred configuration file does not contain any new data, there is immediate passage to the activation step 20b. In addition, the method according to the invention is not limited to programmable logic controllers but rather may also be used for transferring safety-relevant data through robot controllers or monitoring devices which place particular demands on data integrity.

Figure 2:
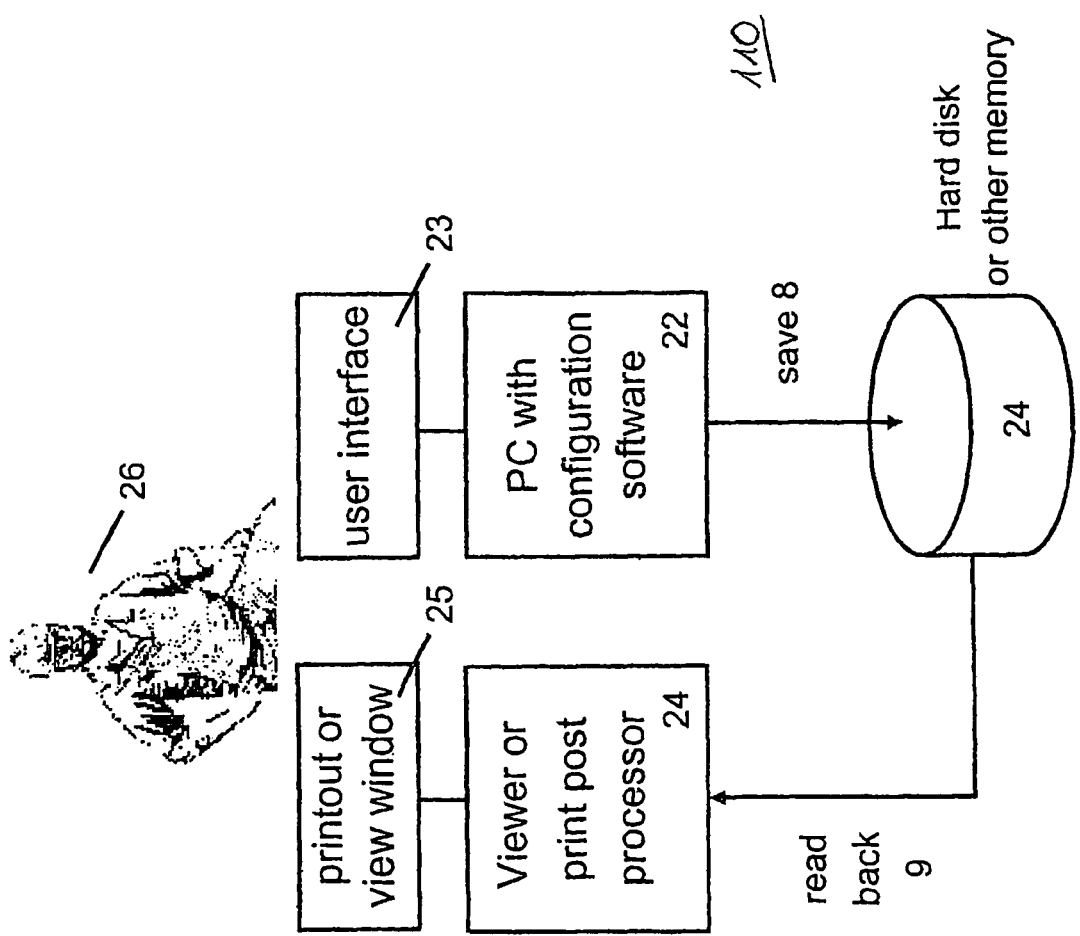
FIG. 2 shows a system for carrying out a method for creating or changing safety-relevant data.

FIG. 2 shows a system for performing the previously described method according to the invention of changing safety-relevant data for a control device, with the method steps from the first step 1 to the thirteenth step 13 being executed on the system arrangement shown by way of example. To this end, a first input apparatus 23 is provided which a user 26 uses to input the desired changes for the safety-relevant data. Information which the user 26 obtains from the first system 110 is presented or displayed by means of a first display apparatus 25, for example a graphics tablet, a screen or other display apparatuses. The first input apparatus 23 is connected to a general-purpose computer 22 on which, in the example chose, the method according to the invention is implemented in the form of a computer program product. To perform the eighth step 8, the general-purpose computer 22 has a hard disk 24 which is used to store the configuration file. Instead of or as redundancy for the hard disk 24, it is also part of the inventive concept that other read only memory units can be used, such as memory cards (for example SD format) or other permanent storage devices or apparatuses diversely known to a person skilled in the art. For performing the control method steps (for example for reading the configuration data in line with the ninth step 9 from the hard disk 24), other devices are shown in the system 110. Thus, in the example chosen, the configuration data which have been read are both printed by a printing apparatus, for example a printer, a plotter or printed to a print file, and also displayed to the user 26 on the display apparatus 25 by means of an appropriate computer program.

Figure 3:
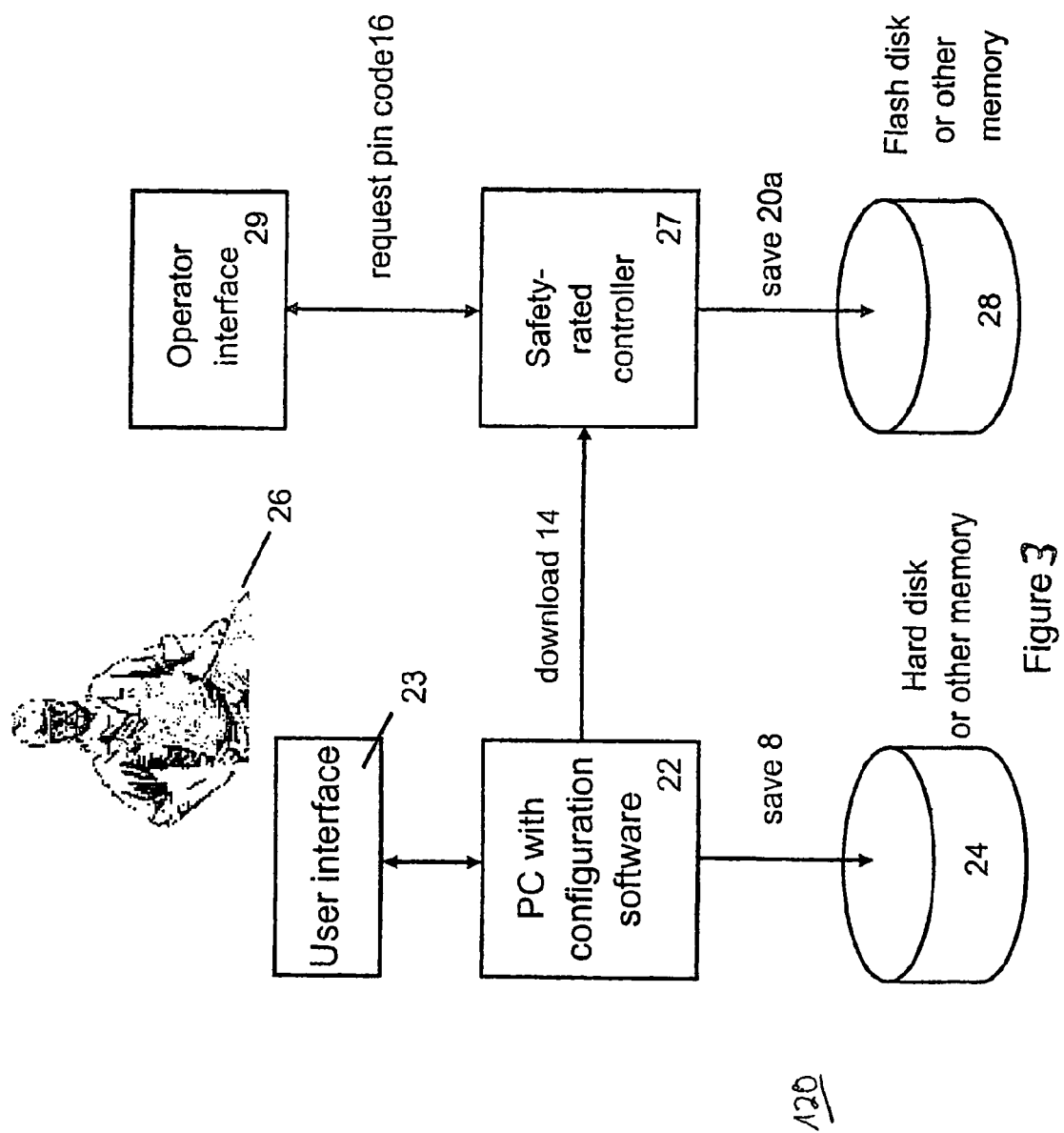
FIG. 3 shows a system for carrying out a method for activating safety-relevant data in a control device.

FIG. 3 shows a second system 120 in which various elements of the first system 110, namely the first input apparatus 23, the hard disk 24 and the general-purpose computer 22, are again shown. However, the second system 120 also has further system elements which then, possibly together with the further elements from FIG. 2, allow all the method steps as shown in the figure to be performed. This is explained in more detail below. Thus, in the chosen example based on the second system 120, the configuration data are transmitted from the general-purpose computer 22 to a control device 27, which needs to meet certain safety requirements (safety rated controller), via a computer network which is not shown in more detail. For the safety check, the control device 27 is connected to a second input apparatus 29 which a user 26 uses, for example to input an activation code in line with the sixteenth step 16. The control device also has a permanent storage apparatus 28, for example a "flash disk", a hard disk or another permanent storage medium.

However, the first system 110 and the second system 120 are merely examples of a system arrangement according to the invention or form of the system according to the invention, and it is thus readily conceivable for only the general-purpose PC 22 to be constantly connected to the control apparatus 27 via a network. Alternatively, this connection can exist only intermittently, namely when a data transmission is performed in line with the fourteenth step 14, for example. Alternatively, it is conceivable for the general-purpose PC 22 to be a portable PC (laptop) and for the network connections or data transmission not to be effected by means of a cable but rather also by means of radio (Bluetooth, infrared etc.), for example, or for the transmission to be effected without direct transmission but rather using a portable storage medium (e.g. memory card, USB stick, floppy disk).

Besides this, it is also readily conceivable and part of the inventive concept for the changed safety-relevant data to be stored on an appropriate memory device in the general-purpose computer 22, or else on a separate memory device or else on the memory device of the control device 27, the latter case involving the existence of a data link between the general-purpose computer 22 and the memory device in the control device 27. It is also readily possible to interpose further computers, or networks (World Wide Web, intranet, local area networks or work networks), using the method and system according to the invention. This also ensures that only one configuration data record is used to supply one, a plurality of or many control device(s) with configuration data.

Finally, it will also be noted that the system and the method according to the invention can also be in a form or applied such that the system components described, particularly the control device 27, the second input apparatus 23 and the memory apparatus 28, are implemented only as virtual components of a simulation program, and hence, by way of example, the method according to the invention is executed and implemented in all variants for test purposes on a single standard PC.

The invention claimed is:

1. A method for changing safety-relevant data for a control device comprising the steps of:
   receiving, from a user, safety-relevant data on a data processing installation;
   displaying the safety-relevant data that is received from the user in a first form during the receiving;
   establishing a first checksum for the safety-relevant data;
   storing the safety-relevant data and the first checksum in a memory in at least one data record on the data processing installation;
   reading back the safety-relevant data from the memory in the data processing installation;
   comparing the received safety-relevant data and the read back safety-relevant data by displaying the read back safety-relevant data to the user in a second form that differs from the first form and the user checking for an error present in the safety-relevant data that was input by the user during the receiving on the data processing installation;
   based on establishment of the first checksum establishing a second checksum upon a determination by the user, as a result of the comparing, that the received safety-relevant data is identical to the read back safety-relevant data and is absent of any errors input by the user during the receiving; and
   storing the second checksum in the at least one data record so as to provide an indication in the at least one data record that the at least one data record has been checked by the user prior to the at least one data record being activated on the control device.

2. The method for changing safety-relevant data according to claim 1, further comprising the step of:
   requesting an authorization for the user prior to receiving the safety-relevant data.

3. The method for changing safety-relevant data according to claim 1, wherein the data processing installation utilizes at least one software program to receive the safety-relevant data.

4. The method for changing safety-relevant data according to claim 1, wherein the data processing installation is a general-purpose data processing installation.

5. The method for changing safety-relevant data according to claim 1, further comprising the steps of:
   generating an enable code using a code generator;
   encrypting the enable code using a key module;
   storing the enable code in the at least one data record; and transmitting the at least one data record to the control device with the safety-relevant data, the encrypted enable code and the first and second checksums as at least one new data record.

6. The method for changing safety-relevant data according to claim 5, further comprising the step of:
checking the at least one new data record against at least one of prior data records and prior checksums stored on a storage medium of the control device to determine that the at least one new data record is known to the control device prior to the at least one new data record being activated in the control device.

7. The method for changing safety-relevant data according to claim 5, further comprising the step of:
enabling the at least one new data record by a comparison of authorization data input by an operator of the control device and the enable code.

8. The method for changing safety-relevant data according to claim 7, wherein the enabling step further entails encrypting the authorization data which is interchanged between the control device and an input device.

9. The method for changing safety-relevant data according to claim 1, further comprising:
encrypting the safety-relevant data.

10. The method for changing safety-relevant data according to claim 9, wherein the encryption is performed using a set of keys produced by a random number generator.

11. The method for changing safety-relevant data according to claim 9, further comprising the steps of:
decrypting the safety-relevant data; and
communicating the decrypted safety-relevant data to at least one of a printing apparatus and a software program.

* * * * *